United States Patent [19]
Cho et al.

[11] Patent Number: 5,494,850
[45] Date of Patent: Feb. 27, 1996

[54] ANNEALING PROCESS TO IMPROVE OPTICAL PROPERTIES OF THIN FILM LIGHT EMITTER

[75] Inventors: Chih-Chen Cho, Richardson; Walter M. Duncan, Dallas, both of Tex.

[73] Assignee: Texas Instruments Incorporated, Dallas, Tex.

[21] Appl. No.: 203,951

[22] Filed: Mar. 1, 1994

[51] Int. Cl.$^6$ .................................................. H01L 21/203
[52] U.S. Cl. .......................... 437/129; 437/126; 437/132; 437/174; 437/107
[58] Field of Search .................................... 437/129, 132, 437/174, 107, 126

[56] References Cited

U.S. PATENT DOCUMENTS 5,229,333  7/1993  Choi et al. ............................ 437/235

OTHER PUBLICATIONS

C.-C. Cho, W. M. Duncan, and Y.-Y. Liu, "Optical and Structural Properties of CaF$_2$·Nd Films on Si–Based Substrates", *Mat. Res. Soc. Symp. Proc.*, vol. 301, 1993, Materials Research Society, pp. 325–330.

L. E. Bausá, R. Legros, and A. Muñoz-Yagüe, "Effect of Nd$^{3+}$ Concentration on the Emission Spectra of CaF$_2$·Nd Layers Grown by Molecular–Beam Epitaxy", *J. Appl. Phys.*, 70 (8), Oct. 15, 1991, pp. 4485–4489.

L. E. Bausá, R. Legros, and A. Muñoz-Yagüe, "Nd$^{3+}$ Incorporation of CaF$_2$ Layers Grown by Molecular Beam Epitaxy", *Appl. Phys. Lett.*, 59 (2), Jul. 8, 1991, pp. 152–154.

L. E. Bausá, C. Fontaine, E. Daran, and A. Muñoz-Yagüe, "Molecular Beam Epitaxy of Nd–Doped CaF$_2$ and CaSrF$_2$ Layers on Si and GaAs Substrates", *J. Appl. Phys.*, 72(2), Jul. 15, 1992, pp. 499–503.

C. A. Freeth and G. D. Jones, "Zeeman Infrared Spectra of Calcium and Strontium Fluoride Crystals Containing Cerium and Neodymium", *J. Phys. C: Solid State Phys.*, 15, 1982, pp. 6833–6849.

MRS Symposium series vol. 116, Yaspir et al. pp. 465–470 (1988).

Primary Examiner—R. Bruce Breneman
Assistant Examiner—Ramamohan Rao Paladugu
Attorney, Agent, or Firm—Michael K. Skrehot; James C. Kesterson; Richard L. Donaldson

[57] ABSTRACT

This invention discloses a method to improve significantly the optical properties of rare-earth doped MBE-grown CaF$_2$ films by annealing such films in a reducing atmosphere (e.g. forming gas) at appropriate temperatures (generally greater than 600 C. Films grown at the same temperature as that used later in the novel annealing process do not exhibit the same PL spectrum nor the high photoluminescence intensity emissions as annealed films. The intensity of the strongest peak 12a in FIG. 2 has a magnitude 3.6 times the intensity than the strongest peak 12 in as-grown film in FIG. 1. Similarly these same films annealed in an oxygen environment do not exhibit the have the desired properties.

14 Claims, 2 Drawing Sheets

ANNEALING PROCESS TO IMPROVE OPTICAL PROPERTIES OF THIN FILM LIGHT EMITTER

CROSS-REFERENCE TO COPENDING APPLICATIONS

Copending application Ser. No. 07/954,197, filed Sep. 30 1992(TI-17086) teaches the use of photo-luminescent (PL) materials in structures to achieve the effect of electroluminescence.

FIELD OF INVENTION

This invention generally relates to materials used in the fabrication of electronic devices for generating photo-luminescence (PL) emissions, more specifically to an annealing process which greatly improves the intensity of such emissions at useful wavelengths.

BACKGROUND OF THE INVENTION

The speed and density of electronic functions which can be achieved within conventional semiconductor integrated circuits and within systems which they comprise are severely limited by the interconnection technology available. On the IC itself the physical electrical properties (resistance, capacitance and inductance) of the connections themselves add complexity and limit speed. On a different scale, multichip modules have the same problems with interconnectivity. The replacement of electrical conductors with light coupled communication means has been a continued pursuit of research.

The availability of practical all-silicon-based optoelectronic integrated circuit technology would very significantly impact a wide range of military and commercial applications. Silicon-based optoelectronic integrated circuit's would not only circumvent the resistivity, capacitance and inductance problems by replacing electron paths with photons paths, they would also provide new circuit functionality, such as circuit level image processing and target recognition. Computer architectures which could benefit from broadcast communication to implement parallel processing would also be affected. In addition, silicon-based optoelectronic integrated circuit's may also provide cost inroads to commercial markets such as high-volume silicon processes and enjoy economies of scale unparalleled by other electronic or optoelectronic material technologies.

SUMMARY

There are four technologies required to make silicon-based optoelectronic integrated circuit's a reality: (1) detectors; (2) waveguides; (3) modulators and (4) emitters. While there has been considerable progress in the first three areas, a lack of an appropriate silicon-based light-emitting device, particularly a silicon-based laser, has greatly hindered the development of fully integrated silicon-based optoelectronic integrated circuit technology.

Most work to date on optoelectronic integrated circuit's has been based on III-V materials such as gallium-arsenide. However, the use of silicon substrates is likely to continue in post ultra-large-scale-integration circuit work because of low material costs, high mechanical strength, good thermal conductivity and the highly developed silicon processing methods available.

Calcium-fluoride ($CaF_2$) can be grown epitaxially on silicon and vice versa. Thus a solid state laser (amplifier) made of $CaF_2$ will be compatible with silicon-based technology. Since the early development of solid state lasers, rare earth doped $CaF_2$ has been explored as a bulk laser material. Several recent studies have shown that rare earth ions can be incorporated into epitaxial fluoride films by using molecular beam epitaxy (MBE), see (1) L. E. Bausa, et al, Applied Physics Letters, vol 59, p152 (1991); (2) L. E. Bausa, et al, Journal of Applied Physics, vol 72, p499, p1757, (1992) and (4) C.-C. Cho, et al, presented at 1993 Spring MRS meeting, San Francisco, Apr 12, Mat. Res. Soc. Sym., Vol. 301, (1993) p. 325. Strong emission intensities were observed from these MBE grown rare-earth doped fluoride films with luminescence at wavelengths similar to their counterparts in bulk materials. In contrast to the bulk material problems of (1) low quenching concentration, (2) charge compensation, and (3) neodymium (Nd) aggregation; high Nd concentrations can be obtained in MBE-grown $CaF_2$:Nd without such problems.

This invention discloses a method to improve significantly the optical properties of rare-earth doped MBE-grown $CaF_2$ films by annealing such films in a reducing atmosphere at appropriate temperatures. Films grown at the same temperature as that used later in the novel annealing process do not exhibit the same PL spectrum nor the high PL intensity emissions as annealed films. Similarly these same films annealed in an oxygen environment do not exhibit the desired properties.

Nd and Er doped $CaF_2$ films were grown on single crystal silicon and aluminum/silicon both with crystal orientation of (111) by MBE as described in co-pending applications, Ser. No. 07/945,991, filed Sep. 15, 1992 (TI-17346) and Ser. No. 07/954,136, filed Sep. 30, 1992 (TI-16928). These films were grown at several temperatures, including that used later for annealing, without noticeable difference in the emission characteristics of these films from their bulk counterparts. Annealing these films in a reducing atmosphere at a temperature of at least 600° C., produced a surprising (and not well understood) result. The emission spectra and intensity suddenly changed from that of the as-grown films. For example, one of the wavelengths had an emission intensity greater than 3 times that of the strongest peak of the as-grown films.

BRIEF DESCRIPTION OF THE DRAWINGS

Operational features and advantages of the present invention will be appreciated by those skilled in the art upon reading the detailed description which follows with reference to the attached drawings, wherein.

DETAILED DESCRIPTION OF PREFERRED EMBODIMENTS

The method of growing Nd and Er doped $CaF_2$ films has been described in co-pending application Ser. No. 07/704,535, filed May 5, 1991 (TI-15427) which is hereby incorporated by reference herein. The Al and $CaF_2$ films were grown on 4-inch diameter Si wafers, in an ultrahigh vacuum system (VG Semicon V80) composed of a MBE chamber and a metallization chamber. Wafers can be transferred between these two chambers through an ultrahigh vacuum transfer system which is served by two loading locks. While there can be numerous variations to the pressures and processes used for the doped film growth, the following were the ones actually used in reducing the invention to practice. Base pressures of the MBE chamber and the metallization were below $1\times10^{-10}$ mbar and $1\times10^{-9}$ mbar, respectively. The chamber pressure during $CaF_2$ growth was $5\times10^{-10}$ mbar and the process pressure during Al growth was $2\times10^{-9}$ mbar. $NdF_3$, $ErF_3$ and $CaF_2$ compositions were evaporated thermally from different effusion cells in the MBE chamber. The deposition rates of these fluorides were determined by controlling the cell temperatures and monitoring the pressure of the fluxes. The deposition rates increase proportionally as the flux pressures increase. The film's composition was determined by x-ray fluorescence. The thickness was determined by step profile measurements.

Virtually any reducing atmosphere can apparently be used for the annealing process but the ones practiced here were forming gas composed of 90% nitrogen and 10% hydrogen at various temperatures from 400° C. to 900° C. for 30 minutes at atmospheric pressure. The minimum time required at any temperature may be related to film thickness, but times of 10–120 minutes can be used.

Novel results of annealing the films in a reducing atmosphere are shown in FIG. 1 through FIG. 5. The PL spectra were all observed when pumped by an argon laser of 515 nm wavelength.

One of the preferred embodiments uses Nd doped $CaF_2$ films. Growing these films at various temperatures from 100° C. to 700° C. generally does not change the emission pattern from that observed in bulk materials, see C. A. Freeth and G. D. Jones, Journal of Physics C, vol 15 (1982) p6833.

Figure 1:
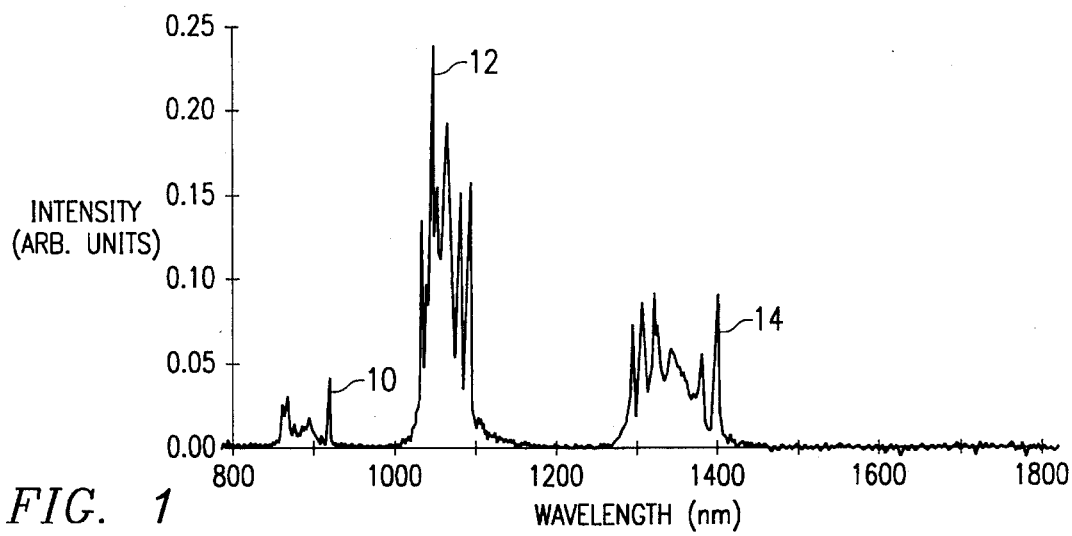
FIG. 1 shows the room temperature PL spectrum of a 1 micrometer thick $CaF_2$:Nd film grown on Si(111) at a temperature of 100° C.

The spectrum of one of these $CaF_2$:Nd films is shown in FIG. 1. This $CaF_2$:Nd film was grown on Si(111) at 100° C. (the stoichiometry of the film composition includes Nd at 0.96 wt %). Some of the prominent emission peaks are identified at 10, 12 and 14 at the approximate wavelengths of 900, 1060 and 1350. These correlate closely with the bulk and are identified as (1) the $^4F_{3/2} \rightarrow {}^4I_{9/2}$ transition at 920.9 nm (2) the $^4F_{3/2} \rightarrow {}^4I_{11/2}$ transitions at 1035.2 nm, 1046.1 nm, 1081.9 nm and 1093.8 nm and (3) the $^4F_{3/2} \rightarrow {}^4I_{13/2}$ transitions at 1293.5 nm, 1307.2 nm, 1320.2 nm 1380.3 nm and 1400.4 nm.

Figure 2:
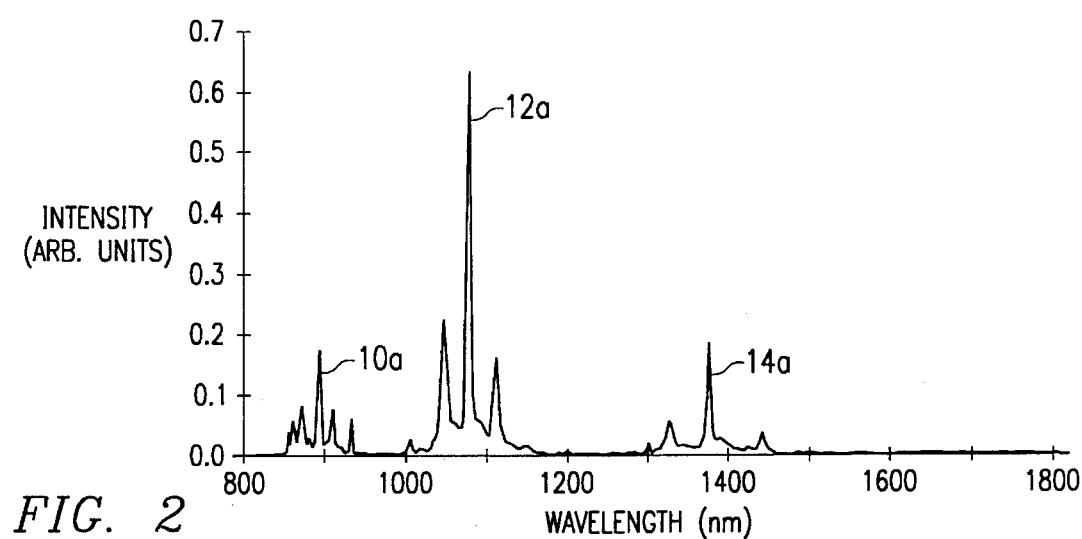
FIG. 2 shows the annealing effects on the PL spectrum of a film of the same type shown in FIG. 1 (note change in vertical scale from FIG. 1)

These $CaF_2$:Nd films were annealed at a temperature of 450° C. in a reducing atmosphere of forming gas with no observable affect on the PL spectra from the as-grown films. However, annealing these $CaF_2$:Nd films in a reducing atmosphere of forming gas at a temperature of 700° C. produced pronounced changes from the as-grown films as shown in FIG. 2. (Note that the vertical scale has changed in FIG. 2 and the peak intensities are much higher.) Although the emission lines are still around 900 nm (10a), 1060 nm (12a) and 1350 nm (14a) as observed in the as-grown films, the wavelengths of the annealed films are different. Sharp and higher peaks were observed at (1) 870.5 nm, 875.8 nm, 886.9 nm, 896.1 nm, 907.7 nm and 947.1 nm in the region of the $^4F_{3/2} \rightarrow {}^4I_{9/2}$ transition; (2) 1030.7 nm, 1059.4 nm, 1088.7 nm, 1092.4 nm and 1126.1 nm in the region of the $^4F_{3/2} \rightarrow {}^4I_{11/2}$ transition; and (3) 1306.6 nm, 1332.1 nm, 1381.0 nm and 1447.3 nm in the region of the $^4F_{3/2} \rightarrow {}^4I_{13/2}$ transition. Note that the intensity of the strongest peak at 1381.0 nm (labeled 12a in FIG. 2) has a magnitude 3.6 times the intensity than the strongest peaks in as-grown film at (1046.1 nm labeled 12 in FIG. 1.)

Figure 3:
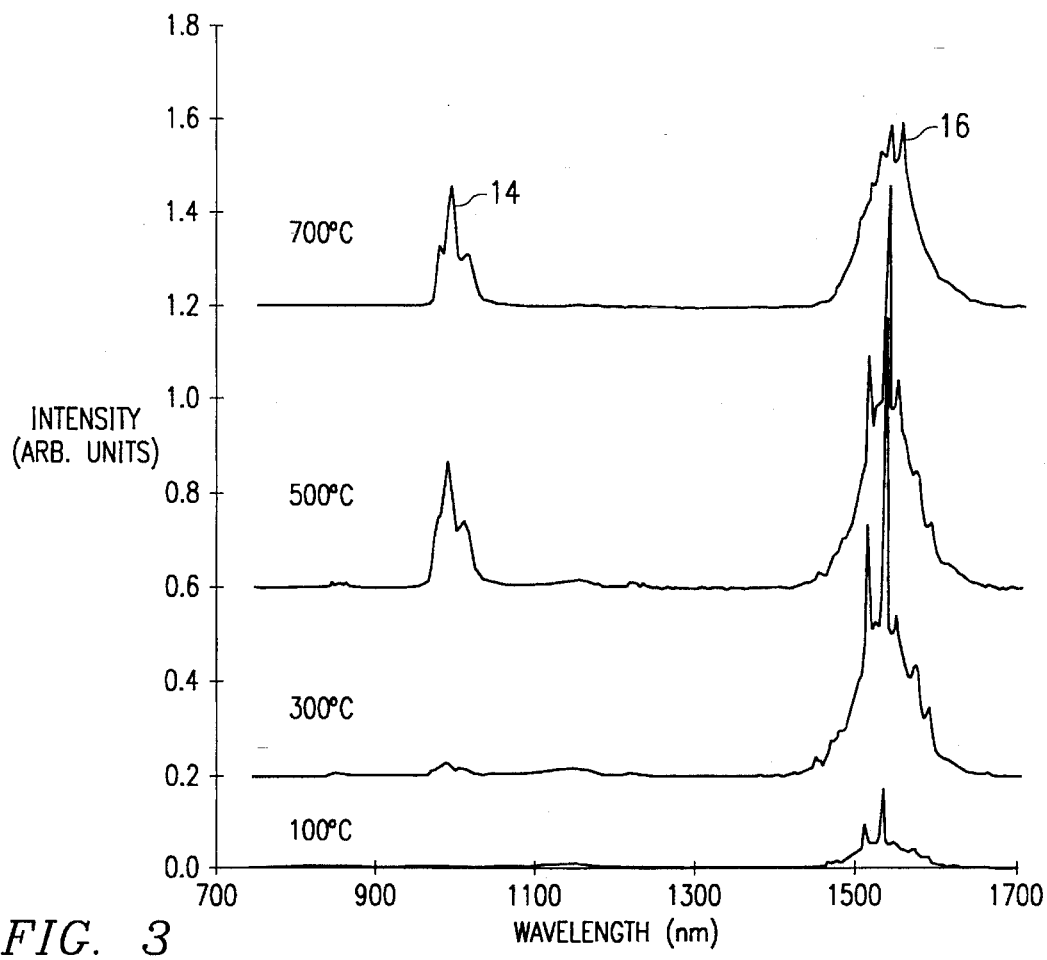
FIG. 3 shows the PL spectra of $CaF_2$:Er as grown at four different temperatures.

Another preferred embodiment utilizes films doped with the rare-earth element, erbium (Er). These $CaF_2$:Er films were prepared in such a manner to produce a composition of $Ca_{(1-x)}F_{(2+x)}$:$Er_x$ where x is 0.036 when grown on Si(111) and x is 0.076 when grown on Al(111) over Si(111). FIG. 3 shows the as-grown PL spectra of $Ca_{(1-x)}F_{(2+x)}$:$Er_x$ films grown at four different temperatures on Si(111). The spectral peaks 14 at 980 nm and 16 at 1530 nm correspond to the transitions at $^4I_{11/2} \rightarrow {}^4I_{15/2}$ and $^4I_{13/2} \rightarrow {}^4I_{15/2}$ respectively. At peak 16 the highest PL intensity is observed for films grown at temperatures of 300° C. and 500° C. Growing at different temperatures changes the relative intensity ratio of the spectral peak 14 to spectral peak 16, becoming larger as the growth temperature increases.

Figure 5:
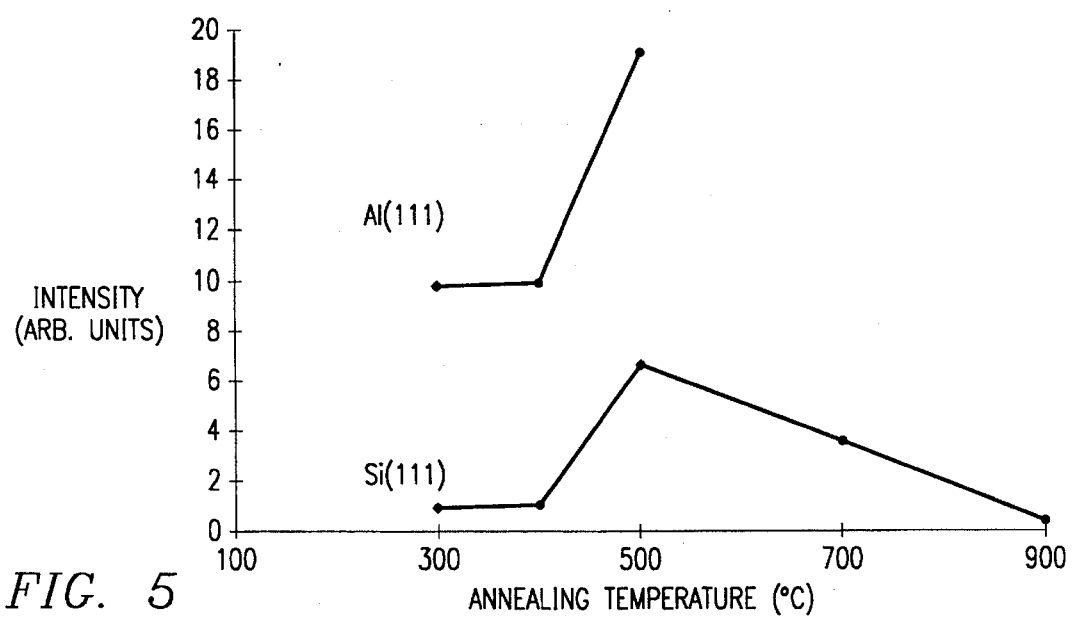
FIG. 5 shows the change of PL emission intensity of the maximum spectral peak in $CaF_2$:Er films grown on substrates of Al(111)/Si(111) and Si(111) after various annealing temperatures.
Figure 4:
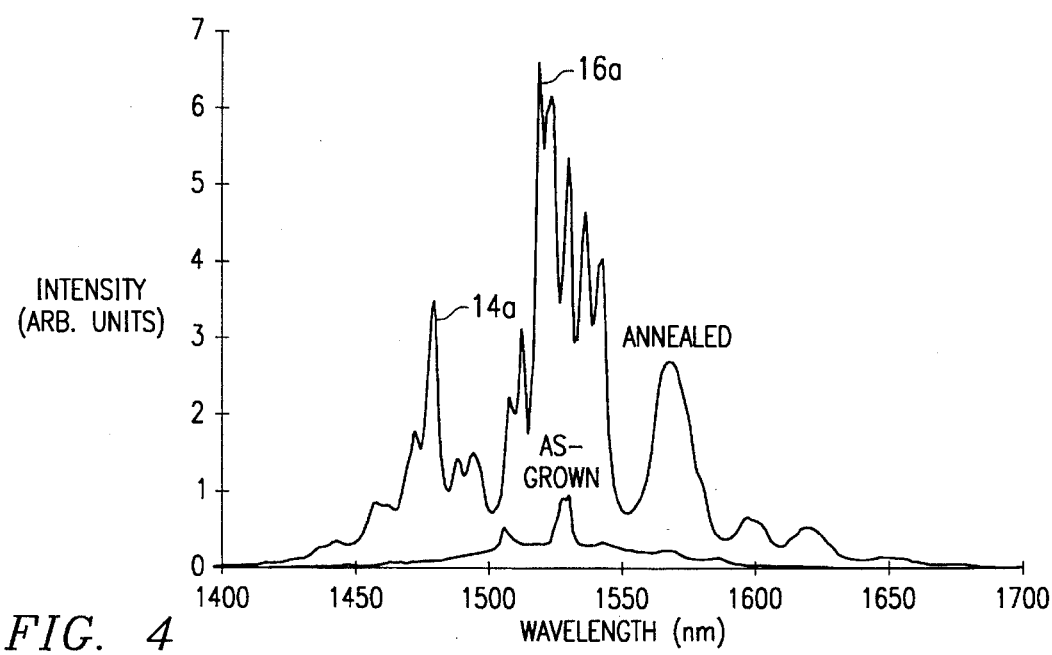
FIG. 4 shows the PL spectra of an as-grown film of $CaF_2$:Er and the same film after annealing.

Annealing the $Ca_{(1-x)}F_{(2+x)}$:$Er_x$ films grown on Si(111) in forming gas at temperatures above 400° C. produced changes in the PL emission spectrum and increased the intensity. FIG. 4 shows the PL spectra of an as-grown $Ca_{(1-x)}F_{(2+x)}$:$Er_x$ film grown on SI(111) at a temperature of 300° C., and the same sample after being annealed at a temperature of 500° C. for 30 minutes. The full-width-half-maximum (FWHM) spectral peak width at 16a (1530 nm) increases from 7.2 nm to 25.3 nm after annealing. The PL intensity increases 6 times after annealing. FIG. 5 shows that films annealed in forming gas at temperatures of 300° C. and 400° C. showed no change in spectral intensity but significant increases at temperatures greater than 400° C. until approximately 800° C.

Still another preferred embodiment utilizes Al (111) approximately 0.3 micrometers thick over Si (111) prior to the growth of $Ca_{(1-x)}F_{(2+x)}$:$Er_x$, with x=0.076. Although these films show similar PL patterns to the films grown at the same temperatures on Si(111), the PL intensities are two to four times higher. Comparison of these film structures grown in both epitaxial and polycrystalline form shows no relationship between the PL intensity and of the crystalline quality, but shows that PL intensity is strongly affected by growth temperature. The maximum PL intensity was observed when films were grown at a temperature of 300° C. FIG. 5 shows the intensity of the maximum spectral peak increase significantly at an annealing temperature of 500° C. Higher annealing temperatures are not allowed for the Al(111)/Si(111) sample because Al would alloy into the Si.

While this invention has been described with reference to specific illustrative embodiments, this description is not intended to be limiting. Various modifications and combinations of the illustrative embodiments, as well as other embodiments of the invention, will be apparent to persons skilled in the art upon reference to the description. One variation which has been anticipated is the use of the rare earth europium (Eu) in films of $CaF_2$ whose optical characteristics are also improved with annealing in a reducing atmosphere. Annealing in hydrogen, various mixtures of hydrogen with nitrogen, helium, argon or any other inert gas are considered to be within the scope of this invention. Although specific pressures, temperatures and equipment were used in the description of illustrative embodiments, there is considerable variety available to effect this invention. For instance, on the rare-earth doped films deposited on silicon, the annealing temperature range can be anywhere in the range above about 400° C. to about 800° C. Since the crystalline form of the material appears to be of minor importance, other methods of deposition (such as sputtering) could be used rather than the MBE growth used in the preferred embodiments.

Electroluminescent and photoluminescent materials share many of the same physical and optical properties, however, the development on photoluminescent materials is generally faster that of electroluminescent work because of the simpler physical structures. Although the physical embodiments herein relate to improving PL spectra of various epitaxially grown films by means of annealing, it is anticipated that these annealled materials will also be used in the electroluminescence devices of the type described in the above mentioned co-pending application Ser. No. 07/954,197, filed Sep. 30 1992 (TI-17086).

It is therefore intended that the appended claims encompass all such modifications or embodiments.

We claim:

1. A method of making a Nd or Er doped calcium fluoride thin film laser, said method comprising:
   a. forming a film of doped calcium fluoride over a silicon substrate; and
   b. annealing said film and substrate in a reducing atmosphere at a temperature of at least 600° C.

2. The method of claim 1, wherein said reducing atmosphere is forming gas.

3. The method of claim 1, wherein a layer of aluminum is deposited over said silicon substrate, and said doped calcium fluoride formed directly on said aluminum layer.

4. The method of claim 3, wherein aluminum layer is formed directly on said silicon substrate.

5. The method of claim 4, wherein said aluminum layer is epitaxially grown on said silicon substrate and said doped calcium fluoride is epitaxially grown on said aluminum layer.

6. The method of claim 1, wherein said doped calcium fluoride is formed directly on said silicon substrate.

7. The method of claim 6, wherein said doped calcium fluoride is epitaxially grown directly on said silicon substrate.

8. The method of claim 1, wherein said annealing temperature is between 600° and 900° C.

9. The method of claim 1, wherein said annealing temperature is between 600° and 800° C.

10. The method of claim 1, wherein said annealing temperature is between 600° and 700° C.

11. The method of claim 1, wherein said annealling is performed for at least 30 minutes.

12. The method of claim 1, wherein said annealling is performed for between 10 and 120 minutes.

13. A method of making a Nd doped calcium fluoride thin film emitter, said method comprising:
   a. epitaxially growing an aluminum layer directly on a single-crystal silicon substrate;
   b. epitaxially growing a film of Nd doped calcium fluoride over said aluminum layer; and
   c. annealing said film and substrate in an atmosphere consisting essentially of 90% nitrogen and 10% hydrogen, and at a temperature of 600°–700° C. for 10–120 minutes.

14. A method of making a Er doped calcium fluoride thin film emitter, said method comprising:
   a. epitaxially growing an aluminum layer directly on a single-crystal silicon substrate;
   b. epitaxially growing a film of Er doped calcium fluoride over said aluminium layer; and
   c. annealling said film and substrate in an atmosphere of consisting essentially of 90% nitrogen and 10% hydrogen, and at a temperature of 600°–700° C. for 10–120 minutes.

* * * * *